United States Patent [19]
Kochling

[11] Patent Number: 5,325,899
[45] Date of Patent: Jul. 5, 1994

[54] ROUTER FIXTURE

[76] Inventor: Edmund Kochling, 290 Lovell St., Worcester, Mass. 01602

[21] Appl. No.: 982,784

[22] Filed: Nov. 30, 1992

[51] Int. Cl.$^5$ .................. B27G 23/00; B27C 5/00
[52] U.S. Cl. ................ 144/144 R; 144/137; 144/372; 144/144.5 GT; 409/130; 33/427; 33/429
[58] Field of Search ............ 409/130, 125, 182; 144/134 R, 134 D, 136 C, 137, 144 R, 144.5, 144.5 GT, 371, 372; 33/197, 427, 429

[56] References Cited

U.S. PATENT DOCUMENTS

| | | |
|---|---|---|
| 2,957,507 | 10/1960 | Vargo . |
| 3,450,001 | 6/1969 | Fortune . |
| 3,841,368 | 10/1974 | Ritter . |
| 3,967,665 | 7/1976 | Lund . |
| 3,985,168 | 10/1976 | Lundquist . |
| 4,062,123 | 12/1977 | Lundquist . |
| 4,579,158 | 4/1986 | O'Meara . |
| 4,630,657 | 12/1986 | Obradovich . |
| 4,880,042 | 11/1989 | Schafferkotter . |
| 4,966,507 | 10/1990 | Hanks . |
| 5,052,454 | 10/1991 | Meinhardt ............ 144/144.5 GT |
| 5,123,453 | 6/1992 | Grisley ............... 144/144.5 GT |
| 5,123,466 | 6/1992 | Ellsworth . |

Primary Examiner—W. Donald Bray
Attorney, Agent, or Firm—Mauro Premutico

[57] ABSTRACT

The present invention relates to router fixture having a base with a base aperture and a pair of slidably adjustable horizontal guides. The router fixture is designed to receive a precut template which defines the area of movement for a router used on the router fixture. The template fits into the guides and defines the area of separation between the guides and also provides an indication as to the area of a workpiece which is to be cut out on the workpiece.

11 Claims, 4 Drawing Sheets

ROUTER FIXTURE

FIELD OF THE INVENTION

The present invention relates generally to an improvement in power tool guides and more specifically to an improved router fixture which is simple to use on workpieces of different shapes and sizes.

BACKGROUND OF THE PRESENT INVENTION

Power hand held routers have become a common and useful woodworking tool for working edges, making grooves of different shapes and sizes, cutting dadoes, and making rabbit cuts. However, the router can be a difficult tool to use skillfully without a guiding device. Although prior art router jigs have attempted to provide such guiding devices, these prior art router jigs have proved to be cumbersome to use, difficult to set up, and limited in application to specific routers and specifically shaped workpieces.

Two examples of prior art router jigs are illustrated in U.S. Pat. No. 2,957,507 to John Vargo and U.S. Pat. No. 3,967,665 to Allan M. Lund. Both of these patents describe router jigs which provide a means for guiding a router. However, both these structures require awkward and time consuming alignment and set up procedures.

U.S. Pat. No. 3,967,665 to Lund describes a routing template assembly having an adjustable elongated slot which defines the area to be cut on a workpiece by a router bit having a guide bushing. As described in the patent, the procedure for adjusting the elongated slot to the desired width requires several time consuming steps which includes the measurement of the radius of a guide bushing used to guide the router and the measurement of a piece of material which defines the width of the slot to be cut on the workpiece. Each of these measurements requires the relevant adjustment of several parts of the jig and the tightening of several screws.

The structure described in U.S. Pat. No. 2,957,507 to Vargo is a routing jig which provides a fixed rectangular frame which contains the body of the router within a specified area. By containing the body of the router, the frame defines the boundaries of movement for the router and thus defines the area cut on the workpiece. However, the width of the Vargo horizontal guide structures is not adjustable and the initial alignment of this structure is awkward and time consuming. The Vargo device also fails to provide an easy and simple method for aligning the device with respect to the area that is to be cut and also fails to provide the versatility of application with respect to different brands of routers which may have different size bases.

SUMMARY OF THE INVENTION

The present invention is directed to an improved router fixture which is positionable over a workpiece and which is attachable to the workpiece with the use of separate attachment means. The router fixture comprises a baseplate having a top surface, a bottom surface and a baseplate aperture extending from the top surface of the template to the bottom surface of the template. A pair of horizontally slidable guides are provided on the top surface of the baseplate. The horizontally slidable guides are adjustable to define an area for receiving a template in a fixed horizontal position. The template has a template aperture which is positionable over the baseplate aperture and which defines the area to be cut out of the workpiece. Vertical template retention means are provided for retaining the insertable template in a fixed vertical position within the pair of horizontally slidable guides, whereby the positioning of the template in the horizontally slidable guides results in the formation of a pair of horizontal guides for the body of the router such that the router will only cut a predetermined area of the workpiece.

It is the object of this invention to provide a routing jig which is simple and easy to use by providing a simple means of alignment of the area to be cut out with the workpiece. It is a further object of this invention to provide a device which can be easily used on oddly shaped workpieces and which will allow a router to cut a groove larger than the diameter of the routing bit on the router.

It is a further object of this invention to provide a router fixture which can be easily and quickly prepared for use by simply inserting a template of a predetermined size into the device. The template serves to automatically define the area of the workpiece which is to be cut by defining the position of the guides used to limit the movement of the body of the router. The fast set up time makes the device especially practical in doing small jobs.

It is a further object of this invention to provide a router fixture which is safe to use and helps to prevent potential injuries caused by flying debris by providing a device which is placed over the workpiece and which covers the immediate area that is being cut by the router bit and which does not require close visual inspection of the router bits location on the workpiece.

DESCRIPTION OF A PREFERRED EMBODIMENTS

Figure 1:
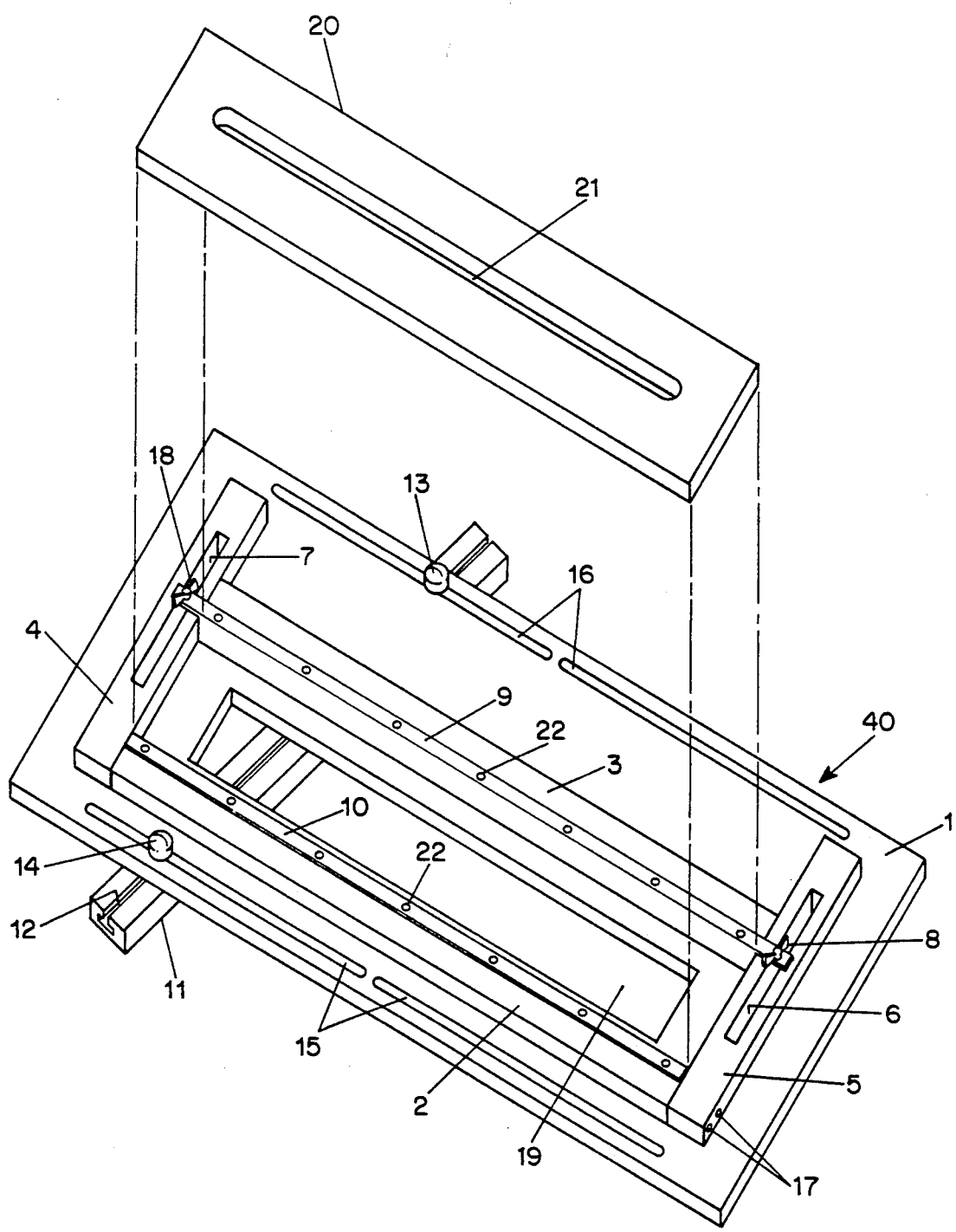
FIG. 1 is a perspective assembly view of the base and template portions of an apparatus embodying the present invention.

With continued reference to the drawings, wherein similar parts are provided with the same number, the present invention is embodied in a router fixture 40 having a base portion 1 which includes a base aperture 19. The base portion 1 may be made of any material which is somewhat rigid and lightweight such as aluminum, plastic, wood or similar type product, such as Masonite. The top of the base portion 1 includes two fixed vertical guides 4 and 5, and two horizontal guides 2 and 3 which are adjustable to receive a template 20 having a template aperture 21. The vertical and horizontal guides can be made with any rigid material such as aluminum, plastic, wood or wood by-product.

Figure 2:
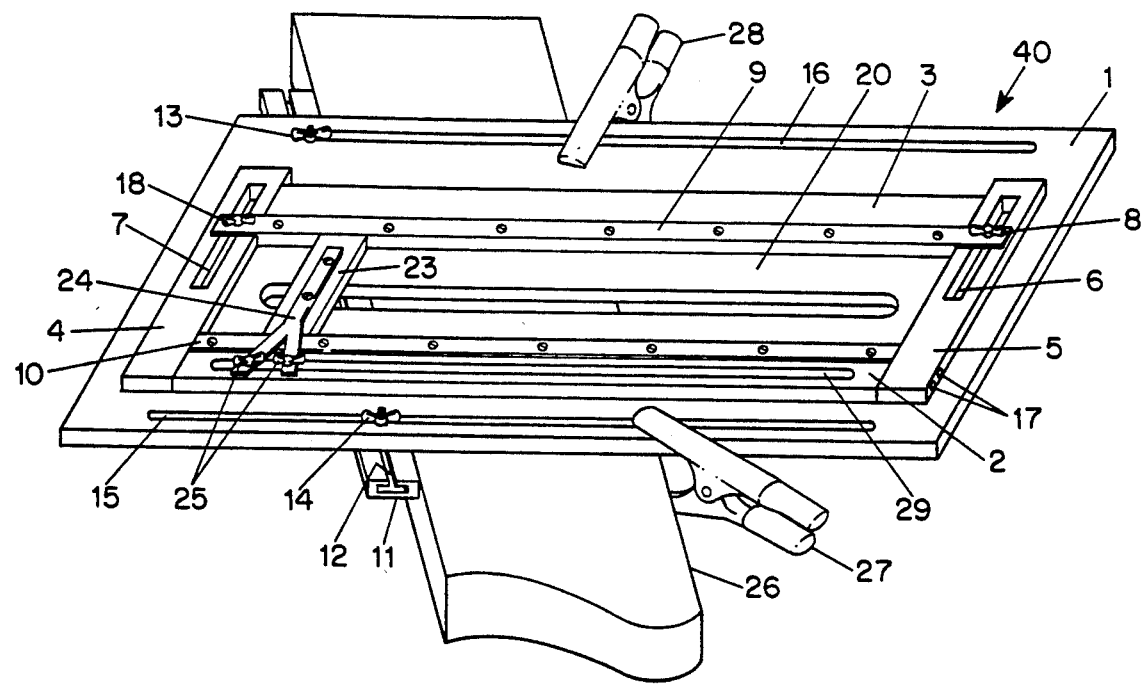
FIG. 2 is a perspective assembly view of the base and template portions of an apparatus embodying the present invention having the template portion inserted therein and attached to a workpiece.
Figure 3:
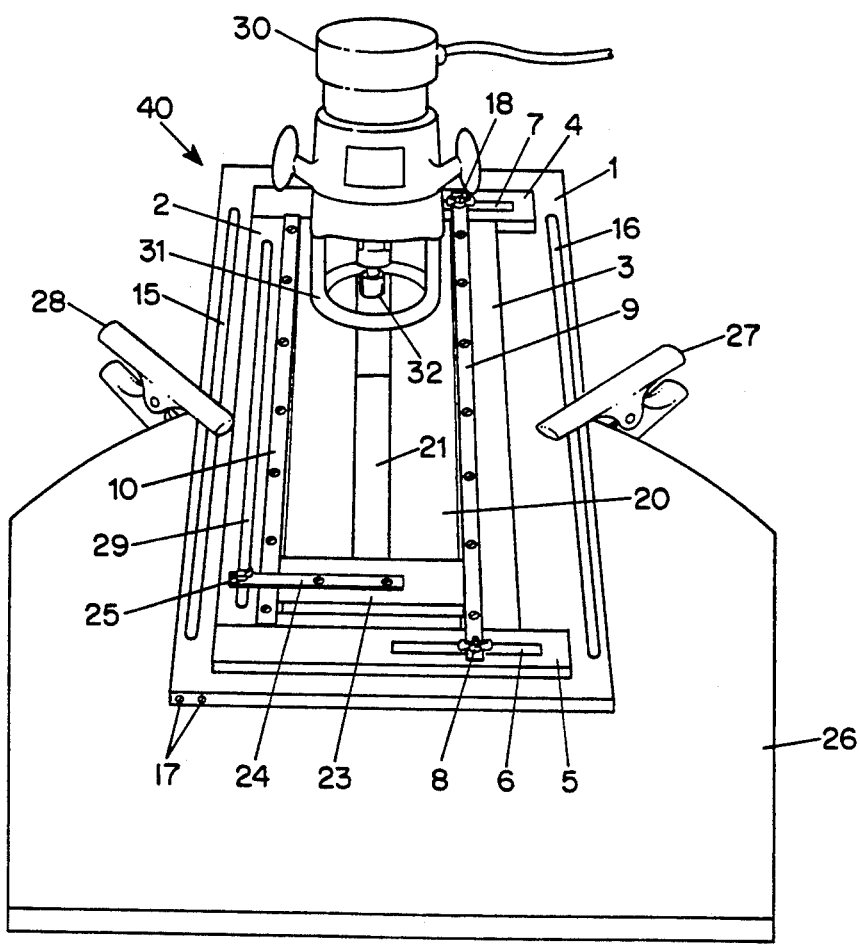
FIG. 3 is a view of the apparatus shown in FIG. 2 with a router positioned within the fixture.

In the router fixture 40 shown in FIGS. 1-3, the vertical guides 4 and 5 and the horizontal guide 2 are in a fixed position relative to the base 1. A template 20, the sizing of which is discussed below, is secured in a fixed position within the router fixture 40 by placing the template within the physical boundaries (i.e., sides) defined by the two vertical guides 4 and 5 and the horizontal guide 2. The side walls of the vertical guides 4 and 5 function as vertical retention means for securing the template 20 in a fixed position relative to the vertical guides 4 and 5. An adjustable horizontal guide 3 is then slid down until the template 20 is in tight contact within horizontal guides 2 and 3. The adjustable horizontal guide 3 is then locked in place by tightening wing nuts 8 and 18. A router fixture 40 having a template 20 inserted therein is shown in FIGS. 2 and 3.

Template 20 functions to define the relative positions of the horizontal guides 2 and 3 and thereby defines the area of movement for a router 30 which is positioned within the router fixture 40. The template 20 is provided with a template aperture 21 which is positioned over the base aperture 19. Once the template 20 is inserted into the router fixture 40, the movement of the router 30, shown in FIG. 3, is limited by the horizontal and vertical guides. The router base 31 rests on the top surface of the template 20. The router bit 32 slides into the template aperture 21 and thereby slides through the base aperture 19 down below the bottom surface of the base 1. The depth adjustment (not shown) of the router 30 may be adjusted to cut out the desired depth from the workpiece 26. The size of the template aperture 21 is not critical to the operation of the router 30 as long as the template aperture 21 is at least as wide as the cut which is to be made on the workpiece 26. However, for purpose of aligning the router fixture 40 relative to the workpiece 26, it has been found preferable to make the width of the template aperture 21 equal to the width of the cut that is to be made on the workpiece 26. Thus, if a ¾ inch dado cut is to be made on workpiece 26, the template 20 should be provided with a template aperture 21 which has a ¾ inches opening. This makes it easy and simple to align the router fixture 40 on the workpiece 26.

The width of the template 20 for the various embodiments of the invention discussed herein may be determined for any router by a simple calculation. The template 20 should have a width equal to the outside width of the router base 31 plus the difference between the width of the template aperture 21 (which is assumed to be equal to the width of the cut to be made on the workpiece 26) and the diameter size of the router bit 32. Thus, in the case where the router bit 32 is equal to the size of the cut that is to be made on the workpiece 26, the width of the template 20 will be the same as the width of the router base 31. However, in the case where a cut is to be made that is wider that the diameter of the router bit 32, then the template 20 must be wider than the router base 31 so that the router bit 32 will be allowed to float from horizontal guide to horizontal guide so that it can cut out an area larger than the router bit 32. For example, if the router base has an outside diameter of 5 inches and a ¼ inch dado router bit is to be used to cut out a ⅜ inch dado in a workpiece, the width of the template 20 would be:

$$\text{Template width} = 5 + (\tfrac{3}{8} - \tfrac{1}{4}) = 5\tfrac{1}{8} \text{ inches.}$$

Thus, the template for the above desired cut would need to be 5.125 inches wide and the template aperture 21 would be .375 inches wide and located in the center of the template 20. Of course, these calculations assume that the template 20 comes in contact with portions of the horizontal guides 2 and 3 which are the same width apart as the portions of the horizontal guides which will come in contact with the router base 31. If this is not the case, the above equations must be modified to compensate for any difference therebetween. This would be a simple procedure for anyone of ordinary skill in the art.

As discussed above, the template size must be varied according to the size of the router base 31 if the router base 31 is to be applied directly to the template surface. Thus, routers having different router base diameters require a different set of templates for each size cut that is to be made on a workpiece. In order to use a single set of templates for multiple routers having different router base diameters, a template base may be used which accepts routers having different base diameters. The base may be made to accept routers having different base diameters by having the template base extend above the planar surface of the highest point on the horizontal guides. This would permit a large router base to slide over the horizontal guides 2 and 3. A second alternative would be to provide a template base which will except the largest size router base available and which also excepts smaller routers. The latter design would permit a lower base design and thereby require a lower extension of the router bit from the base of the router.

If a template base is to be used it would be necessary to provide a means of centering the different router bases on the template base. This could be done by providing a large centerhole in the base which would accept the largest of router bits. A centering piece could then be provided which fits into the centerhole and is provided with an alignment shank fits into the router's tool holder (that part of the router which retains the shaft of a router bit).

Figure 7:
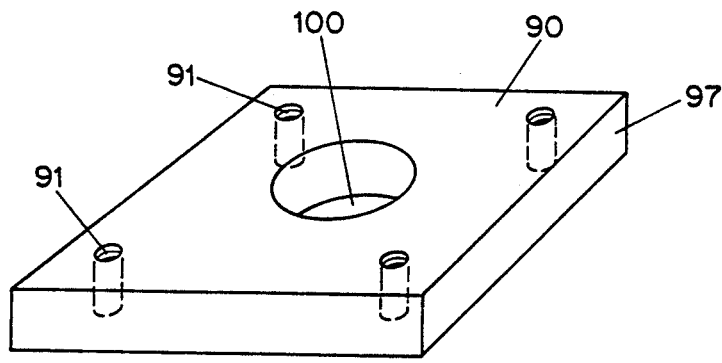
FIG. 7 is a perspective view of a template base for use in a routing fixture of the present invention.
Figure 8:
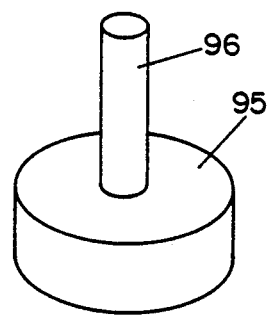
FIG. 8 is a top side view of an alignment piece for the template base shown in FIG. 7.
Figure 9:
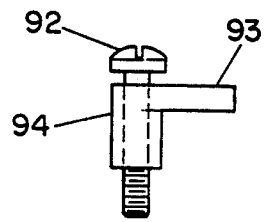
FIG. 9 is a side view of a clip which may be used in conjunction with the template base shown in FIG. 7.

A template base 90 is shown in FIG. 7. The template base 90 is provided with a centerhole 100 for accepting a router bit (not shown) which extends from the router tool holder (not shown) down to the workpiece (not shown). The router base may be attached to the template base 90 by using a number of different engagement means. For instance, screw holes could be provided for screwing the router base directly to the template base 90. The screw holes could be provided such that the router will be centered with the template base 90. Another example of an engagement means is illustrated in FIGS. 7 and 9. A L-shaped clip 93 is shown in FIG. 9. The clip is provided with a passageway area 94 which receives a screw 92. The screw 92 may fit into one of a number of threaded holes 91 provided in the template base 90, as shown in FIG. 7. In order to center the router relative to the template base 90, a centering piece 95 is provided which has the same diameter as the centerhole 100 of the template base 90, as shown in FIG. 8. The centering piece 95 is provided with an alignment shank 96. The alignment shank 96 fits in the tool holder of the router and is used to hold the router in the center of the template base 90 while the router is secured on the template base 90. Because the tool holders of different routers may differ in sizes, i.e. ¼", ⅜" and ½", a small size alignment shank 96 may be provided with sleeves (not shown) for larger tool handlers. Although the centerhole 100 and the centerpiece 95 are shown as round pieces, they could also be made square or any other shape.

Because the template 20 defines the area that is going to be cut on the workpiece, a small router bit may be used to accurately make many different size cuts in a workpiece. Thus, odd sizes can be cut without the need of purchasing new expensive odd size router bits. A template can be simply and cheaply made for less than it costs for a new router bit. Consequently, as it may be appreciated by those skilled in the art, with the use of the router fixture 40, a woodworker needs fewer router bits and may use a smaller and less powerful router to make larger size cuts in the workpiece 26.

As shown in FIGS. 1-3, vertical guides 4 and 5 may be provided with a slot 7 and 6, respectively, which receive a screw for use in securing the horizontal guide 3 in a fixed position once the template 20 has been inserted in place. The adjustable horizontal guide 3 is provided with a metallic corner edge (or cover) 9 which is screwed on the horizontal guide 3 with a series of screws 22 which are set flush with the surface of metallic corner cover 9. The metallic corner cover 9 has two ends which extend over slots 7 and 6. Each of the ends of the corner cover 9 is provided with a hole for receiving the screw extending out from the slot. Wing nuts 8 and 18 are each put on the screws and used to lock the horizontal guide 3 in place.

A metallic corner edge 10 may also be placed on horizontal guide 2. The metallic corner edges 9 an 10 are useful for providing a smooth lasting surface for sliding a router if the horizontal guides 2 and 3 are made of a soft lightweight wood. Of course, the need for a separate corner edge may be eliminated all together if the horizontal guides 2 and 3 are made of a sufficiently rigid and smooth material such as aluminum, hard plastic, or hard wood. Aluminum has been found to be a suitable metal which is lightweight and sufficiently smooth and rigid for use in making metallic corner edges 9 and 10. Although reference is made in the drawings to metallic corner edges, it is to be understood that the corner edges 9 and 10 could also be made of a hard plastic or the like.

Base 1 may also be provided with a fence 11 which is used to angle the router fixture 40 with respect to a workpiece 26. The fence 11 is placed on the bottom of the base and the workpiece 26 is abutted against the fence 11. The fence 11 may be used to make cuts in a workpiece 26 at a constant angle relative to an edge of the wood.

As shown in FIGS. 2 and 3, the router fixture 40 is placed over a workpiece 26 and is clamped onto the workpiece 26 with clamps 27 and 28. It is to be noted here that because the bottom of the base 1 comes in direct contact with the workpiece 26, all screws which are inserted from the bottom of the base 1 to hold the vertical and horizontal guides on the top surface of the base 1 should be countersunk into the base so that the bottom surface of the base 1 remains smooth and will not scratch the surface of the workpiece and will remain flat on the workpiece 26.

Although any number of suitable clamps may be used to attach the router fixture 40 to the workpiece 26, it has been found most preferable to use two spring action clamps 27 and 28, as shown in FIGS. 2 and 3. These spring action clamps 27 and 28 are quickly attached and removed, and make it easy to move and adjust the position of the router fixture 40 relative to the workpiece 26. Although not shown, it would also be possible to provide holes through the base 1 so that the base 1 could be either screwed or nailed onto the workpiece 26.

Figure 6:
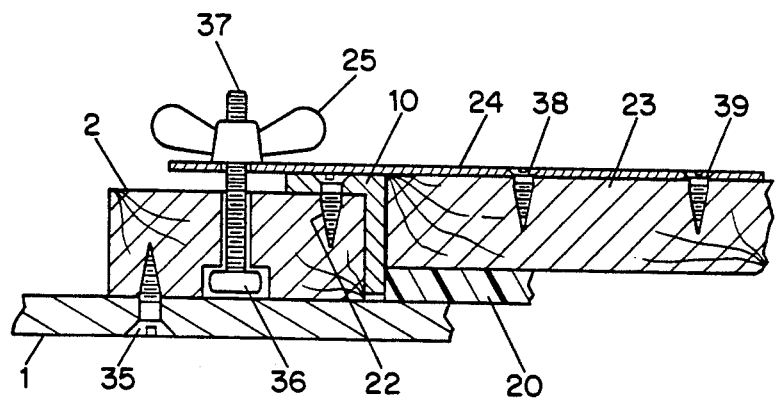
FIG. 6 is cross-sectional view of a guide piece shown in FIGS. 2 and 3.

The router fixture of the present fixture may also be provided with a stop piece 23, as shown in FIGS. 2 and 3. The stop piece 23 is used to provide a physical stop for the router 30 so that the router will not cut beyond a desired point on the workpiece 26. In order to hold the stop piece 23 in place, a horizontal guide piece 2 is provided with a grove 29. A cross-section of the horizontal guide 2 and stop piece 23 is shown in FIG. 6. The stop piece 23 is attached to a support piece 24 with screws 38 and 39. The support piece 24 extends from the stop piece 23 to the groove 29 where a hole is provided in the support piece 24 for receiving the threaded portion of a bolt. A wing nut 25 is then screwed onto the bolt and tightened to secure the stop piece 23 in a fixed position relative to the horizontal guide 2. The horizontal guide 2 is held in a fixed position relative to the base 1 by screws 35 and may additionally be glued to the top surface of the base 1 for additional support.

Figure 4:
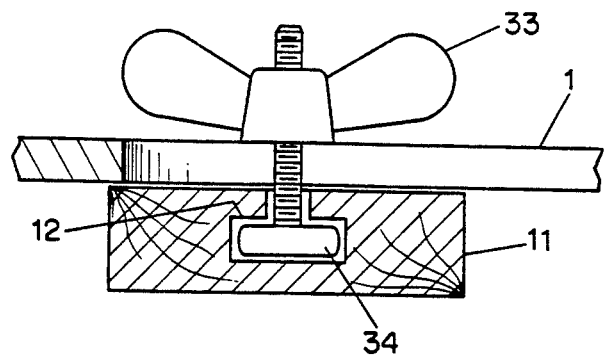
FIG. 4 is a cross-sectional view of a portion of the angle fence used in an embodiment of the present invention.
Figure 5:
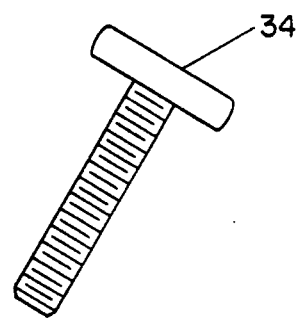
FIG. 5 is a side view of a bolt used in the apparatus of FIG. 1.

The bolt 34, shown in more detail in FIG. 5, is a long threaded bolt having a head which is rectangular in shape. This type of bolt allows a tee-slot to be cut in the horizontal guide 2 which has a wide lower portion, as shown in FIG. 6, which is slightly wider than the shorter width of the bolt head. Once the bolt is placed within the tee-slot, a wing nut can be tightened onto the bolt 34 without the bolt 34 rotating within the lower groove of the horizontal guide 2. Similar bolt and slot arrangements may also be used for securing the horizontal guide 3 to the vertical guides 4 and 5, and to secure the fence 11 to the bottom of the base 1. The bolt and groove arrangement for the fence 11 is shown in FIG. 4 where a tee-slot 12 is provided in the fence 11. A bolt 34 is located within the slot 12 and slid through the opening 15 or 16 in the base 1. The fence is then secured in place by either a wing nut 33, as shown in FIG. 4, or with a knob 13 or 14, as shown in FIGS. 1 and 2. The grooves 15 and 16 are provided for securing the fence 11. These grooves may need to be made as a series of openings, as shown in FIG. 1, rather than a single opening, as shown in FIGS. 2 and 3, if the base material used for the base 1 in not sufficiently rigid to sustain a long grove next to the edge of the base 1. The support piece 24 for the stop piece 23 has been found to be a more stable support if there is provided a wishbone type attachment 25 to the groove 29 of the horizontal guide 2, as shown in FIG. 2. It has also been found preferable to use two long bolts (or screws) 17 which extend through the vertical guides 4 and 5 into the horizontal guide 2 in order to secure the horizontal guide 2 in a fixed position relative to the vertical guides and the base. By tightly securing the two vertical guides 4 and 5 and the horizontal guide 2 to each other and to the base 1, the base 1 is provided with an additional level of strength and rigidness which the base 1 would not have by itself. This helps to provide a lighter router fixture 40 by allowing the use of base material which is lighter than would ordinarily be permissible.

Figure 10:
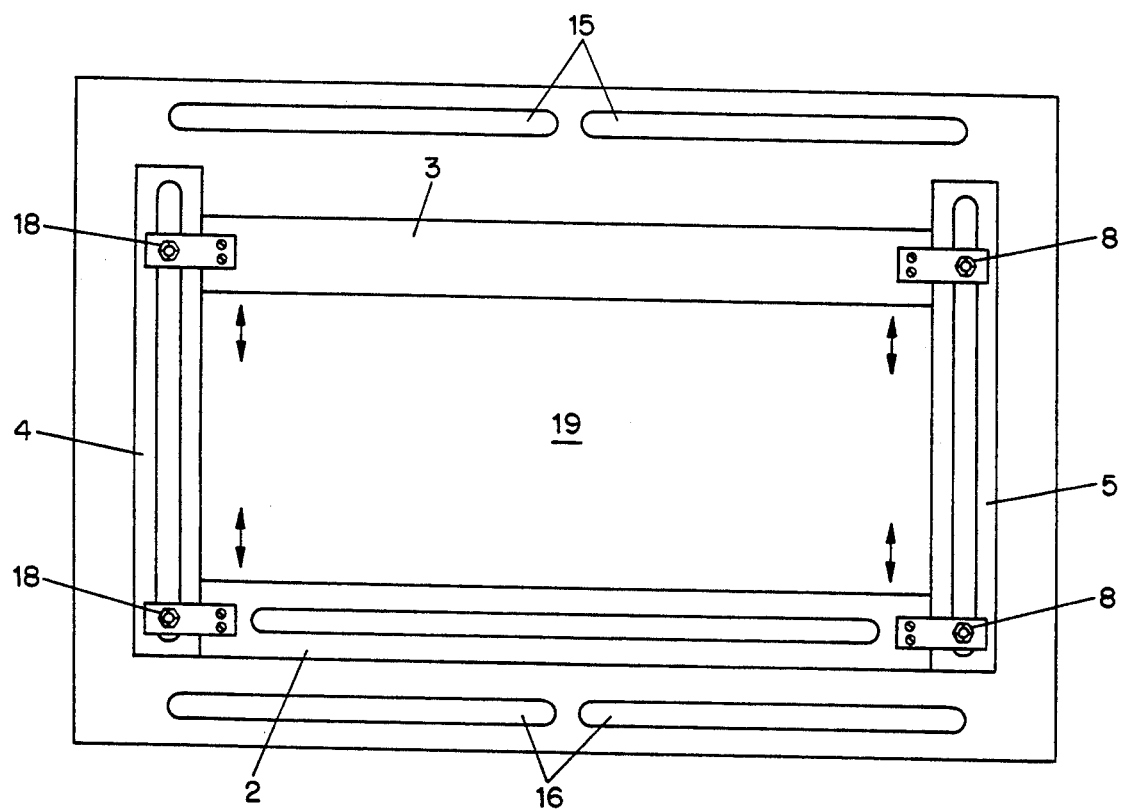
FIG. 10 is a schematic view of an alternative embodiment of the present invention including a dual sliding horizontal guides.

Although preferred embodiments of the invention have been illustrated and discussed herein, there are many modifications and additions which could be made to the structures shown and discussed herein without breaking from the spirit of the invention. For instance, rather than using two vertical guides as illustrated herein, the template could be provided with any number of bumps, knobs or projections which fit into predetermined areas provided within either the horizontal guides or the base of the router fixture such that the template is held in a fixed position when it is being used. The horizontal guides 2 and 3 could also be modified so that both of the horizontal guides are adjustable rather than having a single fixed horizontal guide and one adjustable horizontal guide. The horizontal guides only need to be adjustable relative to each other and relative to the base aperture so that a template can be place therein so that the template aperture is located over the base aperture. A sample of an alternative horizontal guide means is shown in FIG. 10. In addition, the means for securing the horizontal guide 3 could be modified in a number of different ways so that spring action pins could be used to secure the horizontal guide 3 in a fixed position rather than the wing nuts shown herein, and securing means could be provided on the base 1 rather than the vertical guides 4 and 5. Thus, the examples provided herein are intended to be for illustrative purposes only and are not intended to be an exclusive illustration of the possible embodiments of the present invention.

I claim:

1. A router fixture which is positionable over a workpiece comprising:
   a baseplate having a top surface, a bottom surface and a baseplate aperture extending from the top surface to the bottom surface;
   a pair of horizontally slidable guides on the top surface of the baseplate which are adjustable to define an area for receiving a template in a fixed horizontal position, said template having a template aperture which is positionable over the baseplate aperture and which defines the area to be cut out of the workpiece; and
   vertical template retention means for retaining the insertable template in a fixed vertical position within said pair of horizontally slidable guides, whereby the positioning of the template in the horizontally slidable guides results in the formation of a pair of horizontal guides for restraining movement of the router such that the router will not cut out any area of the workpiece which is not exposed by the template aperture.

2. The router fixture of claim 1 further comprising stop means for limiting the movement of the router body beyond a desired point on the workpiece.

3. The router fixture of claim 1 further comprising fencing means for setting the workpiece underneath the jig at a predetermined angle relative to the template aperture such that repetitive cuts of the predetermined angle can be made.

4. A guide fixture for cutting a predetermined portion of a workpiece located below said guide fixture with a cutting device, said cutting device having a cutting member which extends from said cutting device and where said cutting member functions to cut a portion of the workpiece, said guide fixture comprising:
   a base having a top surface, a bottom surface opposite said top surface and an aperture extending from said top surface to said bottom surface, wherein said cutting device may be placed above said top surface such that said cutting member of said cutting device extends through the aperture to the workpiece located below the bottom surface of the base; and
   adjustable guide means coupled to the top surface of the base for receiving a template which defines the outermost boundaries of movement for the cutting device.

5. The guide fixture defined in claim 4, wherein said adjustable guide means includes a template having an aperture which defines the area to be cut out on the workpiece by the cutting member of the cutting device which is placed on the top surface of the base and has an aperture equal to or smaller than the aperture on the base.

6. The guide fixture defined in claim 5, wherein said guide means further comprises a top slidable stop means for limiting the cutting device from cutting beyond a predetermined length on the workpiece.

7. The guide fixture defined in claim 6 further comprising a slidable stop means coupled to the bottom surface of the base for positioning the guide fixture at a predetermined angle relative to the workpiece.

8. A template for use in a router fixture comprising a baseplate having a top surface, a bottom surface and a baseplate aperture extending from the top surface to the bottom surface, a pair of horizontally slidable guides on the top surface of the baseplate which are adjustable to define an area for receiving the template in a fixed horizontal position, and vertical template retention means for retaining the insertable template in a fixed vertical position within said pair of horizontally slidable guides; said template comprising a template aperture which is positionable over the baseplate aperture and which defines the area to be cut out of a workpiece, whereby the positioning of the template in the horizontally slidable guides results in the formation of a pair of horizontal guides for the body of the router such that the router will not cut out any portion of a predetermined area of the workpiece.

9. A router jig comprising:
   a base having a top surface, a bottom surface opposite the top surface and a base aperture extending from the top surface to the bottom surface;
   a pair of horizontal guide means adjustably attached to the top surface of the base and a pair of vertical guide means attached to the top surface of the base such that the horizontal guide means and the vertical guide means define an area containing at least a portion of the base aperture; and
   template means having a template aperture placed within the area defined by the pair of horizontal guide means and the pair of vertical guide means such that the template aperture is locate over the baseplate aperture, said template means including an aperture located over the baseplate aperture which defines the area of a workpiece which is to be exposed for working by a router bit,
   whereby the positioning of the template in the horizontally slidable guides results in the formation of a pair of horizontal guides for the body of a router such that the router will not cut out any area of the workpiece which is not exposed by the template aperture.

10. The router fixture of claim 1 wherein a one of said pair of horizontally slidable guides is in a fixed position.

11. The router fixture of claim 9 wherein a one of said pair of horizontal guide means is in a fixed position.

* * * * *